United States Patent
Zhou et al.

(10) Patent No.: US 10,885,660 B2
(45) Date of Patent: Jan. 5, 2021

(54) OBJECT DETECTION METHOD, DEVICE, SYSTEM AND STORAGE MEDIUM

(71) Applicant: BEIJING KUANGSHI TECHNOLOGY CO., LTD., Beijing (CN)

(72) Inventors: Shuchang Zhou, Beijing (CN); Yi Yang, Beijing (CN); Peiqin Sun, Beijing (CN)

(73) Assignee: BEIJING KUANGSHI TECHNOLOGY CO., LTD., Beijing (CN)

(*) Notice: Subject to any disclaimer, the term of this patent is extended or adjusted under 35 U.S.C. 154(b) by 119 days.

(21) Appl. No.: 16/212,211

(22) Filed: Dec. 6, 2018

(65) Prior Publication Data
US 2019/0266747 A1    Aug. 29, 2019

(30) Foreign Application Priority Data
Feb. 28, 2018 (CN) .......................... 2018 1 0166037

(51) Int. Cl.
*G06T 7/73* (2017.01)

(52) U.S. Cl.
CPC ...... *G06T 7/73* (2017.01); *G06T 2207/20084* (2013.01)

(58) Field of Classification Search
CPC .................. G06K 9/4628; G06T 2207/20024
USPC ............... 382/156, 158, 131, 128; 600/408; 370/330, 329, 210
See application file for complete search history.

(56) References Cited

U.S. PATENT DOCUMENTS

| | | | |
|---|---|---|---|
| 2015/0170002 A1* | 6/2015 | Szegedy | G06K 9/4628 382/156 |
| 2018/0144477 A1* | 5/2018 | Shi | G06K 9/3233 |
| 2018/0260698 A1* | 9/2018 | Lin | G06K 9/4628 |

* cited by examiner

*Primary Examiner* — Kiet M Doan
(74) *Attorney, Agent, or Firm* — Marshall, Gerstein & Borun LLP

(57) ABSTRACT

The present disclosure provides an object detection method, an object detection device, an object detection system and a storage medium. The object detection method includes: acquiring an image to be processed; and inputting the image to be processed into a neural network to obtain a feature map outputted by the neural network. The feature map includes position channels and attribute channels; the position channels include at least one group of candidate position information respectively corresponding to at least one candidate position of at least one prediction object in the image to be processed; and the attribute channels include at least one group of candidate attribute information respectively corresponding to the at least one candidate position.

20 Claims, 4 Drawing Sheets

OBJECT DETECTION METHOD, DEVICE, SYSTEM AND STORAGE MEDIUM

CROSS REFERENCE TO RELATED APPLICATION

The present application claims the priority of Chinese Patent Application No. 201810166037.X filed on Feb. 28, 2018, and the entire content disclosed by the Chinese patent application is incorporated herein by reference as part of the present application.

TECHNICAL FIELD

Embodiments of the present disclosure relate to an object detection method, an object detection device, an object detection system and a storage medium.

BACKGROUND

Currently, in some application scenarios, it may be necessary to detect attribute information of a target object. For example, in the field of face recognition, it is sometimes necessary to detect attribute information such as the age of a person corresponding to a face.

SUMMARY

According to at least an embodiment of the present disclosure, it provides an object detection method. The object detection method comprises: acquiring an image to be processed; and inputting the image to be processed into a neural network to obtain a feature map outputted by the neural network. The feature map comprises position channels and attribute channels; the position channels comprise at least one group of candidate position information respectively corresponding to at least one candidate position of at least one prediction object in the image to be processed; and the attribute channels comprise at least one group of candidate attribute information respectively corresponding to the at least one candidate position.

For example, the at least one group of candidate position information is at least one candidate position vector in a one-to-one correspondence; and the at least one group of candidate attribute information is at least one candidate attribute vector in a one-to-one correspondence.

For example, the object detection method further comprises: aggregating all candidate attribute vectors belonging to a same prediction object among the at least one candidate attribute vector to obtain an aggregate attribute vector belonging to each prediction object among the at least one prediction object.

For example, aggregating all the candidate attribute vectors belonging to a same prediction object among the at least one candidate attribute vector to obtain the aggregate attribute vector belonging to each prediction object among the at least one prediction object comprises one of the following: averaging all the candidate attribute vectors belonging to any prediction object among the at least one prediction object to obtain the aggregate attribute vector belonging to the prediction object; or selecting a candidate attribute vector with maximum modulus, from all the candidate attribute vectors belonging to any prediction object among the at least one prediction object, as the aggregate attribute vector of the prediction object.

For example, the object detection method further comprises: outputting the aggregate attribute vector of each prediction object among the at least one prediction object.

For example, the at least one candidate position is at least one candidate bounding box in a one-to-one correspondence; and the object detection method further comprises: filtering all candidate bounding boxes belonging to a same prediction object among the at least one prediction object to obtain a filtered bounding box belonging to each prediction object among the at least one prediction object.

For example, filtering all the candidate bounding boxes belonging to the same prediction object among the at least one prediction object to obtain the filtered bounding box belonging to each prediction object among the at least one prediction object comprises: determining candidate bounding boxes belonging to the same prediction object among the at least one candidate bounding box by performing non-maximum suppression on the at least one candidate bounding box, and obtaining the filtered bounding box belonging to each prediction object among the at least one prediction object.

For example, aggregating all the candidate attribute vectors belonging to the same prediction object among the at least one attribute position vector to obtain the aggregate attribute vector belonging to each prediction object among the at least one prediction object comprises: as for each candidate attribute vector belonging to any prediction object among the at least one prediction object, calculating a distance between the candidate bounding box corresponding to the candidate attribute vector and the filtered bounding box of the prediction object, and calculating a weighting of the candidate attribute vector according to the distance; and performing weighted average on all the candidate attribute vectors belonging to any prediction object among the at least one prediction object according to the calculated weighting to obtain the aggregate attribute vector belonging to the prediction object.

According to another embodiment of the present disclosure, it provides an object detection device, comprising: an acquisition module configured to acquire an image to be processed; and an input module configured to input the image to be processed into a neural network to obtain a feature map outputted by the neural network. The feature map comprises position channels and attribute channels; the position channels comprise at least one group of candidate position information respectively corresponding to at least one candidate position of at least one prediction object in the image to be processed; and the attribute channels comprise at least one group of candidate attribute information respectively corresponding to the at least one candidate position.

For example, the at least one group of candidate position information is at least one candidate position vector in a one-to-one correspondence; and the at least one group of candidate attribute information is at least one candidate attribute vector in a one-to-one correspondence.

For example, the object detection device further comprises an attribute aggregate module. The attribute aggregate module is configured to aggregate all candidate attribute vectors belonging to a same prediction object among the at least one candidate attribute vector to obtain an aggregate attribute vector belonging to each prediction object among the at least one prediction object.

For example, the attribute aggregate module comprises an averaging submodule; the averaging submodule is configured to average all the candidate attribute vectors belonging to any prediction object among the at least one prediction object to obtain the aggregate attribute vector belonging to the prediction object; or the attribute aggregate module comprises a selection submodule; and the selection submodule is configured to select a candidate attribute vector with maximum modulus, from all the candidate attribute vectors belonging to any prediction object among the at least one prediction object, as the aggregate attribute vector of the prediction object.

For example, the object detection device further comprises an output module. The output module is configured to output the aggregate attribute vector of each prediction object among the at least one prediction object.

For example, the object detection device further comprises a bounding box filter module. The at least one candidate position is at least one candidate bounding box in a one-to-one correspondence; and the bounding box filter module is configured to filter all candidate bounding boxes belonging to a same prediction object among the at least one prediction object to obtain a filtered bounding box belonging to each prediction object among the at least one prediction object.

For example, the bounding box filter module comprises a suppression submodule. The suppression submodule is configured to determine candidate bounding boxes belonging to the same prediction object among the at least one candidate bounding box by performing non-maximum suppression on the at least one candidate bounding box, and obtain the filtered bounding box belonging to each prediction object among the at least one prediction object.

For example, the attribute aggregate module comprises a weighting calculation submodule and a weighted average submodule. The weighting calculation submodule is configured to, as for each candidate attribute vector belonging to any prediction object among the at least one prediction object, calculate a distance between the candidate bounding box corresponding to the candidate attribute vector and the filtered bounding box of the prediction object, and calculate a weighting of the candidate attribute vector according to the distance; and the weighted average submodule is configured to perform weighted average on all the candidate attribute vectors belonging to any prediction object among the at least one prediction object according to the calculated weighting to obtain the aggregate attribute vector belonging to the prediction object.

According to another embodiment of the present disclosure, it provides an object detection system, comprising a processor and a storage device. Computer instructions are stored in the storage device; and an object detection method is executed when the computer instructions are run by the processor; the object detection method comprises: acquiring an image to be processed; and inputting the image to be processed into a neural network to obtain a feature map outputted by the neural network, wherein the feature map comprises position channels and attribute channels; the position channels comprise at least one group of candidate position information respectively corresponding to at least one candidate position of at least one prediction object in the image to be processed; and the attribute channels comprise at least one group of candidate attribute information respectively corresponding to the at least one candidate position.

According to another embodiment of the present disclosure, it provides a non-volatile storage medium. Computer instructions are stored in the non-volatile storage medium; and the object detection method is executed when the computer instructions are run.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
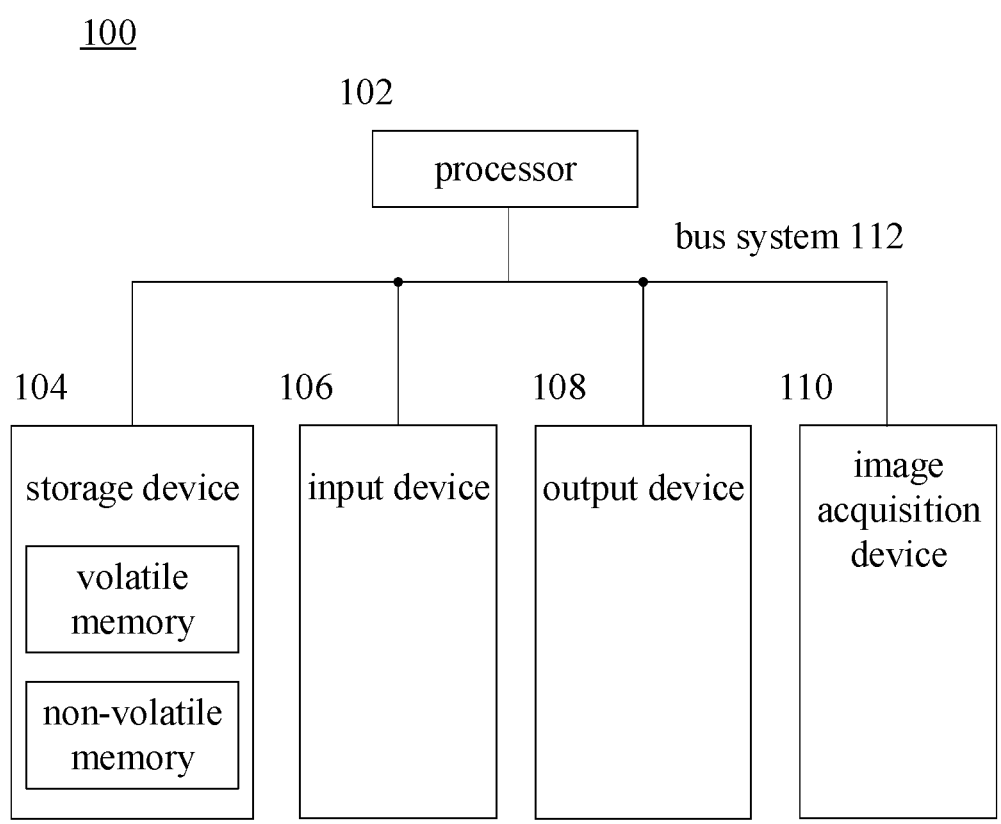
FIG. 1 is a schematic block diagram of an exemplified electronic device for implementing the object detection method and the object detection device provided by embodiments of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

In an attribute detection method, the position detection and the attribute detection of an object are divided into two steps. For example, the position of a target object is detected from an image at first, and then the attribute information of the target object is extracted from the image based on the position of the target object. This method requires many computing resources, which poses a challenge for deployment on an embedded terminal, and meanwhile, may make the entire processing time of the image longer and result in a poor real-time performance.

In order to solve the above problem, embodiments of the present disclosure provide an object detection method, an object detection device, an object detection system and a storage medium. According to the embodiments of the present disclosure, the position detection and the attribute detection are integrated, and the simultaneous detection of position and attribute is realized through a neural network. The object detection method provided by the embodiments of the present disclosure requires less amount of calculation, is easy to implement lightweight terminal deployment solution, and meanwhile, can more efficiently process the image. The object detection method and the object detection device provided by the embodiments of the present disclosure can be applied to any field that needs to identify object attribute, such as face recognition, text recognition, pedestrian detection, vehicle detection, etc.

Firstly, description is given to an exemplified electronic device 100 for implementing the object detection method and the object detection device provided by the embodiments of the present disclosure with reference to FIG. 1.

As shown in FIG. 1, the electronic device 100 includes one or more processors 102 and one or more storage devices 104. For example, the electronic device 100 can further include an input device 106, an output device 108 and an image acquisition device 110. These components are connected with each other through a bus system 112 and/or connecting mechanisms in other forms. It should be noted that the components and the structure of the electronic device 100 as shown in FIG. 1 are only illustrative and not limitative. The electronic device can also include other components and structures as needed.

For example, the processor 102 can be implemented by at least one hardware form of a digital signal processor (DSP), a field programmable gate array (FPGA), a programmable logic array (PLA) or a microprocessor. The processor 102 can be one or a combination of a central processing unit (CPU), a graphics processing unit (GPU), an application specific integrated circuit (ASIC) or processing units in other forms having data processing capability and/or instruction execution capability, and can control other components in the electronic device 100 to execute expected functions.

For example, the storage device 104 can include one or more computer program products. The computer program products can include computer readable storage media in various forms, e.g., volatile memory and/or nonvolatile memory. The volatile memory, for example, can include random access memory (RAM) and/or a cache memory. The non-volatile memory, for example, can include read-only memory (ROM), hard disk, flash memory, etc. One or more computer instructions can be stored in the computer readable storage medium, and the processor 102 can execute the computer instructions to realize the client function and/or other expected functions in the embodiments of the present disclosure (implemented by the processor) as described below. The computer readable storage medium can also store various kinds of applications and various kinds of data, for example, various kinds of data used and/or produced by the applications.

For example, the input device 106 can be a device used by a user to input instructions, and can include one or more of a keyboard, a mouse, a microphone and a touch screen.

For example, the output device 108 can output various kinds of information (e.g., image and/or voice) to the outside (e.g., the user), and can include one or more of a display and a loudspeaker. For example, the input device 106 and the output device 108 can be integrated into a same device and implemented by a same interactive device (e.g., a touch screen).

For example, the image acquisition device 110 can acquire images to be processed (can be static images or video frames), and store acquired images in the memory device 104 for the use of other components. The image acquisition device 110 can be an independent camera or a camera in a mobile terminal. It should be understood that the image acquisition device 110 is only illustrative, and the electronic device 100 cannot include the image acquisition device 110. In this case, other devices with image acquisition capability can be utilized to acquire images to be processed and send the acquired images to the electronic device 100.

Illustratively, the exemplified electronic device for implementing the object detection method and the object detection device provided by the embodiments of the present disclosure can be implemented on a device such as a personal computer or a remote server.

Figure 2:
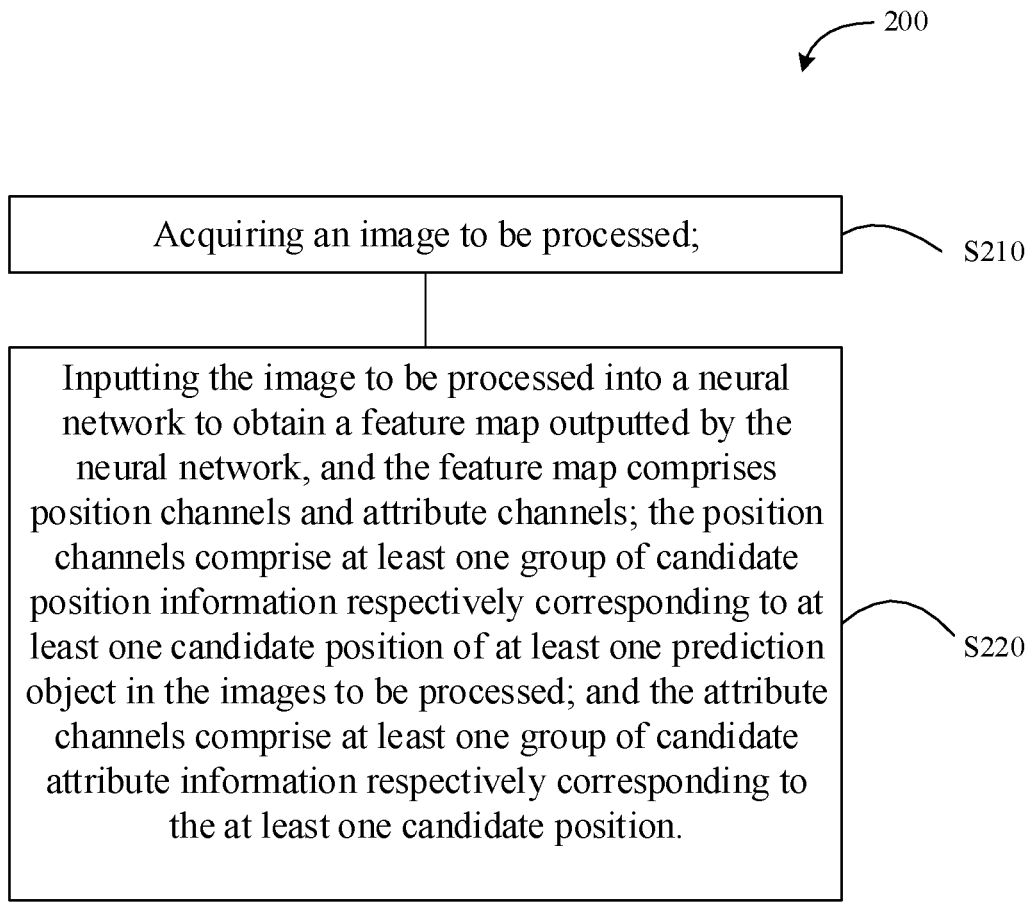
FIG. 2 is a schematic flowchart of an object detection method provided by an embodiment of the present disclosure.

Hereinafter, an object detection method provided by embodiments of the present disclosure will be described with reference to FIG. 2. FIG. 2 is a schematic flowchart of an object detection method 200 provided by an embodiment of the present disclosure. As shown in FIG. 2, the object detection method 200 includes the following steps S210 and S220.

S210: acquiring an image to be processed.

The image to be processed can be any image that is needed for the recognition of an object. The object in the present disclosure can be any object, including but not limited to: text, specific pattern, one part of a person or a human body (such as a face), an animal, a vehicle, a building, etc.

The image to be processed can be a static image and can also be a video frame in a video. The image to be processed can be original image acquired by the image acquisition device and can also be an image obtained after a pre-processing (e.g., digitizing, normalizing or smoothing) of the original image.

S220: inputting the image to be processed into a neural network to obtain a feature map outputted by the neural network. The feature map includes position channels and attribute channels; the position channels include at least one group of candidate position information respectively corresponding to at least one candidate position of at least one prediction object in the image to be processed; and the attribute channels include at least one group of candidate attribute information respectively corresponding to the at least one candidate position.

Illustratively, the image to be processed can be extracted in a form of tensor, so as to obtain image tensor. The image tensor can represent the image to be processed. The input of the image to be processed into the neural network can be the input of the image tensor into the neural network.

In the embodiments of the present disclosure, the neural network can be any appropriate network such as a convolutional neural network. After the image to be processed is inputted into the neural network, the neural network can output a plurality of feature maps. The neural network can include any number of network layers such as convolutional layers, pooling layers, fully-connected layers and softmax layers. The network parameters of the neural network, such as the number of the convolutional layers, the number of the pooling layers, the number of the fully-connected layers, the connection order of the convolutional layers and the pooling layers, the length and the width of a convolution kernel of each convolutional layer, and the step length of each pooling layer, can be adjusted.

According to the embodiments of the present disclosure, in the neural network, the number of channels outputting the feature map can be increased, so channels relevant to attribute information are added based on position information output. For example, by designing of the network structure of the neural network, the work of attribute extraction can be combined into the neural network, so that the neural network can also output the attribute information of a prediction object in each bounding box (bbox) in the process of outputting the bounding box information.

Illustratively, when the neural network is adopted for image processing, a plurality of images to be processed can be simultaneously inputted into the neural network to accelerate the processing speed of the images. In this case, the feature map outputted by the neural network can be represented by a four-dimensional tensor, respectively length, width, channel and patch. The number of elements in the patch dimension is consistent with the number of the images to be processed inputted into the neural network. The elements in the patch dimension are in a one-to-one correspondence with the images to be processed inputted into the neural network. Regardless of the patch dimension, as for each image to be processed, the feature map corresponding to the image can be a three-dimensional tensor.

Description will be given below by taking the case that the number of the images to be processed is one as an example. Illustratively, after the image to be processed is inputted into the neural network, the feature map outputted by the neural network can be represented by a three-dimensional tensor. The three-dimensional tensor is divided into three dimension, namely length, width and channel, for example, respectively represented by m, k and n. In n channels, $n_1$ channels are position channels and $n_2$ channels are attribute channels. The feature map outputted by the neural network can be represented by a three-dimensional tensor with a size m×k×n. For example, supposing that the feature map outputted by the neural network is a three-dimensional tensor with a size of 16×16×10, and supposing that each candidate position is represented by a candidate bounding box, the candidate position information of each bounding box can be the position coordinate of the candidate bounding box. For example, the candidate bounding box can be a rectangular frame, and the position coordinate of the candidate bounding box can be four coordinate values of the candidate bounding box, for example, the horizontal axis x on the top left corner of the candidate bounding box, the vertical axis y on the top left corner, the width w of the bounding box, and the height h of the bounding box. Thus, in 10 channels of the feature map, the previous 4 channels can be position channels, and each position channel corresponds to one coordinate value; and the latter 6 channels can be attribute channels, and each attribute channel corresponds to one attribute. For example, supposing that the object is a human face, each element in the $1^{st}$ attribute channel (namely the $5^{th}$ channel in the 10 channels) can be used for representing the age of a person corresponding to a prediction face on corresponding candidate position. It should be noted that the bounding box can also be in other shapes, e.g., square or circular, and correspondingly, the position coordinate of the bounding box can also be represented in other forms, which are not limited by the embodiments of the present disclosure.

Continuing to use the above example, supposing that the feature map outputted by the neural network is a three-dimensional tensor with the size of 16×16×10, it can be understood that 16×16 candidate positions are obtained by prediction, and each candidate position corresponds to a 1×10 one-dimensional vector. For example, each candidate position corresponds to candidate position information of 4 dimensions and candidate attribute information of 6 dimensions.

The prediction object refers to an object predicted by the neural network, and the prediction object can be indicated by the candidate position (e.g., the candidate bounding box). Each candidate position indicated by the feature map represents that there is a prediction object at the position, and different candidate positions can correspond to a same prediction object. For example, 20 candidate bounding boxes can be obtained by prediction as for a human face A, and the position of these candidate bounding boxes can be close to each other; and redundant candidate bounding boxes can be filtered by some subsequent algorithms (for example, non-maximum suppression as described below), and a bounding box with appropriate size and position (can be an aggregate bounding box aggregated by the candidate bounding boxes) is obtained for a single face. It should be understood that as the prediction object is an object predicted by the neural network, the prediction object can be inconsistent with an actual object, for example, the human face can be predicted at a place without face originally. In addition, each prediction object among the at least one prediction object corresponds to one or more candidate positions among the at least one candidate position, and different prediction objects can correspond to same or different numbers of candidate positions. Thus, the number of the at least one prediction object can be equal or unequal to the number of the at least one candidate position.

The attribute information in the embodiment of the present disclosure can include attribute information in a one-to-one correspondence with one or more object attributes of the object. For example, when the object is a face, the object attributes can include the age of a person corresponding to the face, the gender of the person corresponding to the face, the face size, the face angle, the blurring degree of the face, whether the face is shielded, etc. Moreover, for example, when the object is a vehicle, the object attributes can include the license plate number, the vehicle color, the vehicle model, etc.

The object detection method provided by the embodiments of the present disclosure integrates the work that must be completed by two steps into one step, simultaneously obtains the position information and the attribute information of the object by sharing the feature maps, and then significantly reduces the amount of calculation. The method can effectively save computing resources and storage resources and can easily realize a lightweight terminal deployment solution. In addition, the method can also improve the processing speed of the neural network on each image, and further realize the real-time processing of the image. Particularly when the object detection method is applied to the processing of video streaming, the object detection method can well satisfy the real-time processing requirement of video streaming.

Illustratively, the object detection method provided by the embodiments of the present disclosure can be implemented in a device, apparatus or system provided with a memory and a processor.

The object detection method provided by the embodiments of the present disclosure can be deployed at an image acquisition terminal, for example, can be deployed at an image acquisition terminal of a access control system in the application field of security protection, and moreover, for example, can be deployed at a personal terminal such as a smart phone, a tablet PC or a personal computer in the application field of finance.

In addition, the object detection method provided by the embodiments of the present disclosure can also be respectively deployed at a server side (or a cloud) and a personal terminal. For example, the images to be processed can be acquired at a client; the client transmits the acquired images to be processed to the server side (or the cloud); and the server side (or the cloud) performs the object detection.

According to the embodiments of the present disclosure, the at least one group of candidate position information is at least one candidate position vector in a one-to-one correspondence, and the at least one group of candidate attribute information is at least one candidate attribute vector in a one-to-one correspondence.

Description has been given above to the position information and the attribute information in the channel dimension of the feature map. The representations of the candidate position vectors and the candidate attribute vectors are to be understood with reference to the above description, and details are not described here again.

According to the embodiments of the present disclosure, the object detection method 200 can further include: aggregating all the candidate attribute vectors belonging to a same prediction object among the at least one candidate attribute vector to obtain an aggregate attribute vector belonging to each prediction object among the at least one prediction object.

As a plurality of prediction positions may be predicted for the same prediction object, a plurality of candidate attribute vectors will be correspondingly obtained. Thus, the plurality of candidate attribute vectors belonging to the same prediction object can be aggregated together to obtain an aggregate attribute vector to represent the attribute of the prediction object. In one attribute detection method, the attribute information is extracted only once from the image containing the object. Compared with the attribute detection method, the object detection method provided by the embodiments can integrate the information of the plurality of candidate attribute vectors, and then can improve the accuracy rate of attribute detection.

According to the embodiment of the present disclosure, the step of aggregating all the candidate attribute vectors belonging to the same prediction object among the at least one candidate attribute vector to obtain the aggregate attribute vector belonging to each prediction object among the at least one prediction object includes one of the following: averaging all the candidate attribute vectors belonging to any prediction object among the at least one prediction object to obtain the aggregate attribute vector belonging to the prediction object; and selecting a candidate attribute vector with maximum modulus, from all the candidate attribute vectors belonging to any prediction object among the at least one prediction object, as the aggregate attribute vector of the prediction object.

In the embodiments of the present disclosure, the means for aggregating the candidate attribute vectors can be random. In one example, as for any prediction object, elements corresponding to any attribute in all the candidate attribute vectors belonging to the prediction object can be averaged, and the obtained average value is taken as an element corresponding to the attribute in the aggregate attribute vector of the prediction object. For example, supposing that there are two candidate attribute vectors belonging to a certain prediction object X, which are respectively represented by $a_1$ and $a_2$, and supposing that each candidate attribute vector outputted by the neural network is a one-dimensional vector with a size of 1×6, 6 elements are included and respectively correspond to 6 attributes. Then an average value of the $1^{st}$ element of $a_1$ and the $1^{st}$ element of $a_2$ can be calculated, and the calculated average value can be taken as the $1^{st}$ element of the aggregate attribute vector of the prediction object X. The calculation methods of other elements of the aggregate attribute vector are similar to that of the $1^{st}$ element, and details are not described here again.

In another example, as for any prediction object, a candidate attribute vector with maximum modulus, selected from all the candidate attribute vectors belonging to the prediction object, is taken as the aggregate attribute vector of the prediction object. The calculation method of the modulus of the vector can be understood by those skilled in the art, so no further description will be given here in the present disclosure.

In still another example, as for any prediction object, all the candidate attribute vectors belonging to the prediction object can be subjected to weighted average, and a vector obtained by weighted average is taken as the aggregate attribute vector of the prediction object. In the process of weighted average, the weighting of each candidate attribute vector can be the distance between the candidate bounding box corresponding to the attribute vector and a center bounding box of the prediction object. The determination mode of the center bounding box will be described below.

Illustratively, the object detection method 200 can further include: determining candidate positions in the at least one candidate position, belonging to the same prediction object, according to the at least one group of candidate position information respectively corresponding to the at least one candidate position. For example, an overlap ratio of any two candidate bounding boxes can be calculated, and whether the two candidate bounding boxes belong to the same prediction object is determined according to the overlap ratio. As the candidate bounding boxes are in a one-to-one correspondence with both the candidate position vectors and the candidate attribute vectors, after determining which candidate bounding boxes belong to the same prediction object, which candidate position vectors belong to the same prediction object and which candidate attribute vectors belong to the same prediction object can be also determined.

According to the embodiments of the present disclosure, the object detection method 200 can further include: outputting the aggregate attribute vector of each prediction object among the at least one prediction object.

In one example, the aggregate attribute vector of each prediction object can be outputted by an output device such as a display for the user to view. It should be understood that in the process of outputting the aggregate attribute vector, the aggregate attribute vector can be converted into forms such as text, image and voice and outputted. In another example, the aggregate attribute vector of each prediction object can be outputted to an external device such as a remote server by wired or wireless means.

According to the embodiments of the present disclosure, the at least one candidate position is at least one candidate bounding box in a one-to-one correspondence, and the object detection method 200 can further include: filtering all the candidate bounding boxes belonging to a same prediction object among the at least one prediction object to obtain a filtered bounding box belonging to each prediction object among the at least one prediction object.

As described above, a plurality of candidate bounding boxes may be predicted for a same prediction object, so redundant candidate bounding boxes can be filtered, and a bounding box with appropriate size and position is obtained as for a single prediction object. The process can be realized by filtering all the candidate bounding boxes belonging to the same prediction object.

According to the embodiments of the present disclosure, the step of filtering all the candidate bounding boxes belonging to the same prediction object among the at least one prediction object to obtain the filtered bounding box belonging to each prediction object among the at least one prediction object can include: determining candidate bounding boxes belonging to the same prediction object among the at least one candidate bounding box by performing non-maximum suppression on the at least one candidate bounding box; and obtaining the filtered bounding box belonging to the prediction object.

The implementation of the non-maximum suppression (NMS) method will be described below. Firstly, for example, the at least one candidate bounding box can be subjected to preliminary screening according to score. The score is the probability that the candidate bounding box contains the actual object. The neural network can also output the score of the candidate bounding box while outputting the position information of the candidate bounding box, and the score can occupy one channel of the feature map. Apart from the position channels and the attribute channels, the feature map outputted by the neural network can also include score channels. The score channel includes at least one group of score information respectively corresponding to the at least one candidate position. Each group of score information can be one score data that is configured to indicate the probability that corresponding candidate position contains the actual object, namely the probability that corresponding prediction object is the actual object.

Illustratively, the step of performing preliminary screening on the at least one candidate bounding box according to the score can include: filtering candidate bounding boxes among the at least one candidate bounding box, of which the score is less than a preset score threshold, and retaining the remaining candidate bounding boxes. For example, candidate bounding boxes of which the score is less than 0.3 can be filtered. The filter type can be that the score of the candidate bounding box is directly set to be 0, namely the probability that the candidate bounding box contains the actual object is set to be 0, so as to provide convenience for discarding the candidate bounding box.

Subsequently, the at least one candidate bounding box can be sequenced according to the score. In the case of not performing preliminary screening on the at least one candidate bounding box, the at least one candidate bounding box can be sequenced according to the original score of the candidate bounding boxes. In the case of performing preliminary screening on the at least one candidate bounding box, the scores of the candidate bounding boxes of which the score is less than the score threshold are all set to be 0, so these candidate bounding boxes will be ranked last (supposing that the scores are ranked according to the sequence from high to low). The candidate bounding boxes of which the score is set to be 0 can participate in the subsequent steps such as the calculation of the overlap ratio, but will be finally discarded. Illustratively, in the case of performing preliminary screening on the at least one candidate bounding box, the candidate bounding boxes of which the score is set to be 0 can be ignored, and only the candidate bounding boxes after preliminary screening are sequenced. The candidate bounding boxes of which the score is set to be 0 cannot participate in the subsequent steps such as the calculation of the overlap ratio, and will be discarded before sequencing.

After the candidate bounding boxes are sequenced according to the score, a candidate bounding box with the maximum score is selected. Subsequently, the overlap ratio between each remaining candidate bounding box and the candidate bounding box with the maximum score is calculated one by one. Illustratively, the overlap ratio between two candidate bounding boxes can be represented by the intersection-over-union (IoU) between the two candidate bounding boxes. The calculation method of the IoU of the bounding box can be understood by those skilled in the art, so no further description will be given here in the present disclosure. Two candidate bounding boxes of which the overlap ratio is greater than a preset threshold can be determined to belong to a same prediction object, and conversely, two candidate bounding boxes of which the overlap ratio is less than or equal to the preset threshold can be determined to not belong to the same prediction object. Therefore, which candidate bounding boxes belong to the same prediction object can be determined after preliminary screening and overlap ratio calculation.

If the overlap ratio between any remaining candidate bounding box and the candidate bounding box with the maximum score is greater than the preset threshold, the remaining candidate bounding boxes are discarded. Subsequently, a candidate bounding box with maximum score can be selected from candidate bounding boxes that do not belong to the same prediction object with the candidate bounding box with the maximum score, and the above process is repeated. For example, supposing the number of the at least one candidate bounding box is ten, six bounding boxes B1, B2, B3, B4, B5 and B6 are left after preliminary screening, in which the candidate bounding box B3 has the maximum score, and the IoU between the candidate bounding boxes B2 and B3 and the IoU between the candidate bounding boxes B5 and B3 are both greater than the preset threshold, so the candidate bounding box B3 can be marked as the retained first bounding box, and the candidate bounding boxes B2 and B5 are discarded. The method of discarding the candidate bounding boxes B2 and B5 can be that the scores of the candidate bounding boxes B2 and B5 are set to be 0. Subsequently, the candidate bounding box B6 with the maximum score is selected from the remaining candidate bounding boxes B1, B4 and B6, and the IoU between the candidate bounding boxes B1 and B6 and the IoU between the candidate bounding boxes B1 and B6 are respectively calculated. Supposing the IoU between the candidate bounding boxes B4 and B6 is greater than the preset threshold, the candidate bounding box B4 can be discarded, and B6 is marked as the retained second bounding box. The above process can be repeated continuously, until all the retained bounding boxes are found. In the above example, the three candidate bounding boxes B3, B6 and B1 can be finally retained.

By the above operation, one final bounding box, namely the filtered bounding box, can be obtained for each prediction object.

According to the embodiments of the present disclosure, the step of aggregating all the candidate attribute vectors belonging to the same prediction object among the at least one attribute position vector to obtain the aggregate attribute vector belonging to each prediction object among the at least one prediction object can include: as for each candidate attribute vector belonging to any prediction object among the at least one prediction object, calculating a distance between the candidate bounding box corresponding to the candidate attribute vector and the filtered bounding box of the prediction object, and calculating a weighting of the candidate attribute vector according to the distance; and performing weighted average on all the candidate attribute vectors belonging to any prediction object among the at least one prediction object according to the calculated weighting to obtain the aggregate attribute vector belonging to the prediction object.

As described above, as for any prediction object, all the candidate attribute vectors belonging to the prediction object can be subjected to weighted average, and a vector obtained by weighted average is taken as the aggregate attribute vector of the prediction object.

For example, supposing that 10 candidate bounding boxes are predicted as for a prediction object Y, 10 candidate position vectors and 10 candidate attribute vectors are correspondingly obtained. The 10 candidate bounding boxes can be filtered to obtain a filtered bounding box. The filtered bounding box can be taken as a center bounding box of the prediction object Y. The distance between any candidate bounding box and the center bounding box can be calculated according to the candidate position information corresponding to the candidate bounding box and the candidate position information corresponding to the center bounding box. Illustratively, the distance between any candidate bounding box and the center bounding box can be represented by the distance between a specific position of the candidate bounding box and corresponding position of the center bounding box. For example, the distance between any candidate bounding box and the center bounding box can be represented by the distance between a center point of the candidate bounding box and a center point of the center bounding box. Moreover, for example, the distance between any candidate bounding box and the center bounding box can be represented by the distance between a vertex in the upper left corner of the candidate bounding box and a vertex in the upper left corner of the center bounding box.

The distance between the 10 candidate bounding boxes and the center bounding box can be respectively calculated, and the weighting of the candidate attribute vector corresponding to each candidate bounding box can be calculated according to the distance between each candidate bounding box and the center bounding box. Illustratively, the weighting of the candidate attribute vector corresponding to any candidate bounding box can be inversely proportional to the distance between the candidate bounding box and the center bounding box. For example, supposing the final remaining bounding box (namely the filtered bounding box and the center bounding box) after NMS among the 10 candidate bounding boxes is the candidate bounding box B2, in the process of weighting calculation, the distance between the candidate bounding box B2 and the center bounding box is 0, and the weighting of the candidate attribute vector corresponding to B2 can be set to be 1. The weighting of the candidate attribute vectors corresponding to the other 9 candidate bounding boxes are all set to be less than 1. Moreover, when the distance from the center bounding box is larger, the weighting is smaller.

Finally, 10 candidate attribute vectors corresponding to the 10 candidate bounding boxes are subjected to weighted average, and the obtained average value is taken as the aggregate attribute vector of the prediction object Y.

Figure 3:
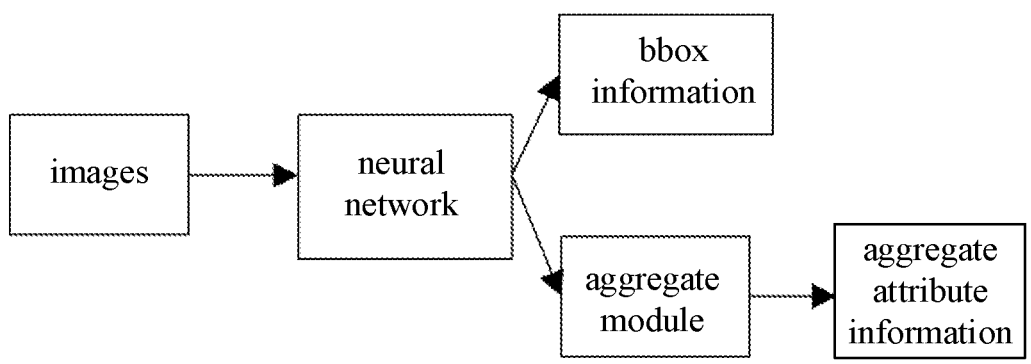
FIG. 3 is a schematic flowchart of an object detection method provided by an embodiment of the present disclosure.

FIG. 3 is a schematic flowchart of an object detection method provided by one embodiment of the present disclosure. Description will be given below by taking the processing of video streaming as an example.

Firstly, as shown in FIG. 3, each image frame of video streaming is sent into the neural network after pre-processing. Secondly, the neural network processes this image frame, and also outputs attribute information of a plurality of channels on the basis of outputting bounding box information. Thirdly, the attribute information outputted by the neural network is sent into an aggregate module, and the aggregate module mainly implements aggregate algorithm (for example, averaging a plurality of candidate attribute vectors belonging to the same prediction object), and outputs the aggregated aggregate attribute information, for example, to an external server.

For example, the object detection method 200 can further include training steps of the neural network. Illustratively, the object detection method 200 can further include: acquiring sample images and corresponding marked data, in which the marked data can include sample position information of a sample object in the sample image and sample attribute information in a one-to-one correspondence with at least one object attribute of the sample object in the sample image; and training the neural network by utilization of the sample image and the marked data. For example, the sample image can be inputted into the neural network to obtain training position information of the sample object and training attribute information in a one-to-one correspondence with the at least one object attribute of the sample object, outputted by the neural network; and the neural network is trained according to the sample position information and the sample attribute information, the training position information and the training attribute information, and the prebuilt loss function of the neural network.

The sample image can be any image of which the position information and the attribute information are known. The number of the sample images can be arbitrarily set as required. It should be understood by those skilled in the art that the sample position information is a target value of the training position information; the sample attribute information is a target value of the training attribute information; and the loss function can be configured to weigh up the inconsistence between the sample position information and the training position information and between the sample attribute information and the training attribute information. The loss function can be minimized by optimizing the parameters of the neural network until it converges, and finally a trained neural network can be obtained. Subsequently, the trained neural network can be applied in an actual object detection scenario.

Figure 4:
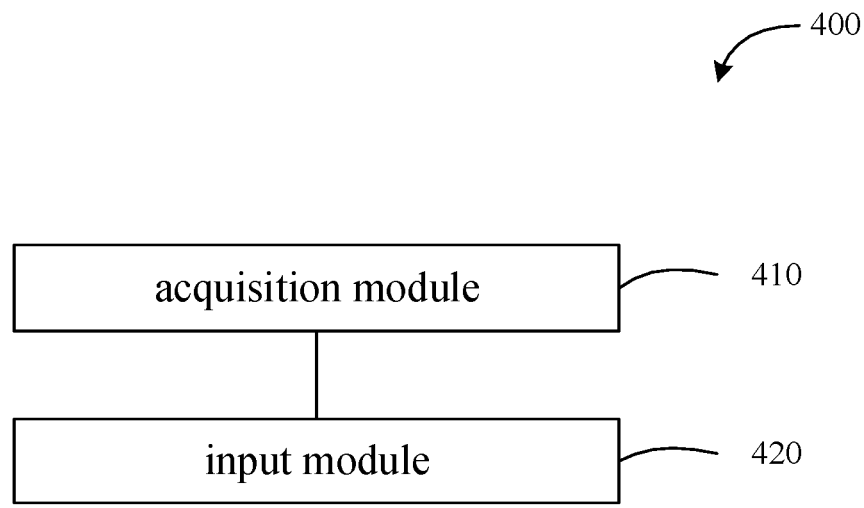
FIG. 4 is a schematic flowchart of an object detection device provided by an embodiment of the present disclosure.

Another aspect of the present disclosure provides an object detection device. FIG. 4 is a schematic block diagram of an object detection device 400 provided by one embodiment of the present disclosure.

As shown in FIG. 4, the object detection device 400 provided by the embodiments of the present disclosure includes an acquisition module 410 and an input module 420. The modules can respectively execute the steps/functions of the object detection method described above with reference to FIGS. 2-3. Description will be given below only to the main functions of the components in the object detection device 400, and the details that have been described above will be omitted.

The acquisition module 410 is configured to acquire an image to be processed. The acquisition module 410 can be implemented by adoption of the processor 102 in the electronic device 100 as shown in FIG. 1 to run the computer instructions stored in the storage device 104.

The input module 420 is configured to input the images to be processed into a neural network to obtain a feature map outputted by the neural network. The feature map includes position channels and attribute channels; the position channels include at least one group of candidate position information respectively corresponding to at least one candidate position of at least one prediction object in the image to be processed; and the attribute channels include at least one group of candidate attribute information respectively corresponding to the at least one candidate position. The input module 420 can be implemented by adoption of the processor 102 in the electronic device 100 as shown in FIG. 1 to run the computer instructions stored in the storage device 104.

Illustratively, the at least one group of candidate position information is at least one candidate position vector in a one-to-one correspondence, and the at least one group of candidate attribute information is at least one candidate attribute vector in a one-to-one correspondence.

Illustratively, the object detection device 400 further includes: an attribute aggregate module (not shown) which is configured to aggregate all candidate attribute vectors belonging to a same prediction object among the at least one candidate attribute vector to obtain an aggregate attribute vector belonging to each prediction object among the at least one prediction object.

Illustratively, the attribute aggregate module includes one of the following: an averaging submodule configured to average all the candidate attribute vectors belonging to any prediction object among the at least one prediction object to obtain the aggregate attribute vector belonging to the prediction object; or a selection submodule configured to select a candidate attribute vector with maximum modulus, from all the candidate attribute vectors belonging to any prediction object among the at least one prediction object, as the aggregate attribute vector of the prediction object.

Illustratively, the object detection device 400 further includes: an output module (not shown) which is configured to output the aggregate attribute vector of each prediction object among the at least one prediction object.

Illustratively, the at least one candidate position is at least one candidate bounding box in a one-to-one correspondence, and the object detection device 400 further includes: a bounding box filter module (not shown) which is configured to filter all the candidate bounding boxes belonging to a same prediction object among the at least one prediction object and obtain a filtered bounding box belonging to each prediction object among the at least one prediction object.

Illustratively, the bounding box filter module includes: a suppression submodule configured to determine candidate bounding boxes belonging to the same prediction object among the at least one candidate bounding box by performing non-maximum suppression on the at least one candidate bounding box, and obtain the filtered bounding box belonging to each prediction object among the at least one prediction object.

Illustratively, the attribute aggregate module includes: a weighting calculation submodule configured to, as for each candidate attribute vector belonging to any prediction object among the at least one prediction object, calculate a distance between the candidate bounding box corresponding to the candidate attribute vector and the filtered bounding box of the prediction object and calculate a weighting of the candidate attribute vector according to the distance; and a weighted average submodule configured to perform weighted average on all the candidate attribute vectors belonging to any prediction object among the at least one prediction object according to the calculated weighting to obtain the aggregate attribute vector belonging to the prediction object.

It should be understood by those skilled in the art that the units and the algorithm steps of the examples described with reference to the embodiments of the present disclosure can be implemented by electronic hardware or a combination of computer software and electronic hardware. Whether these functions are executed by hardware or software depends on the specific application and the design constraints of the technical solution. Different methods can be used by those skilled in the art to realize the described functions for each specific application, but such an implementation should not be considered beyond the scope of the present disclosure.

Figure 5:
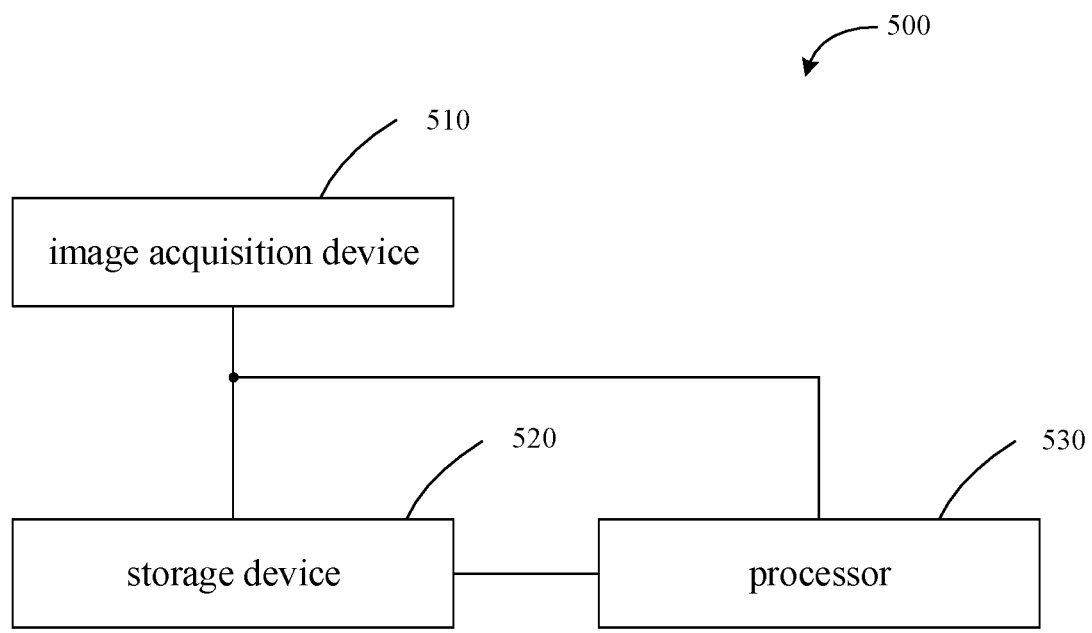
FIG. 5 is a schematic block diagram of an object detection system provided by an embodiment of the present disclosure.

FIG. 5 is a schematic block diagram of an object detection system 500 provided by one embodiment of the present disclosure. The object detection system 500 includes an image acquisition device 510, a storage device 520 and a processor 530.

For example, the image acquisition device 510 is configured to acquire images to be processed. The image acquisition device 510 is optional, and the object detection system 500 can not include the image acquisition device 510. In this case, other image acquisition devices can be utilized to acquire the images to be processed and send the acquired images to the object detection system 500.

For example, the storage device 520 stores computer instructions for implementing corresponding steps in the object detection method provided by the embodiments of the present disclosure.

For example, the processor 530 is configured to run the computer instructions stored in the storage device 520 to execute corresponding steps of the object detection method provided by the embodiment of the present disclosure.

In an embodiment, when the computer instructions are run by the processor 530, the following steps are executed: acquiring an image to be processed; and inputting the image to be processed into a neural network to obtain a feature map outputted by the neural network. The feature map includes position channels and attribute channels; the position channels include at least one group of candidate position information respectively corresponding to at least one candidate position of at least one prediction object in the image to be processed; and the attribute channels include at least one group of candidate attribute information respectively corresponding to the at least one candidate position.

Illustratively, the at least one group of candidate position information is at least one candidate position vector in a one-to-one correspondence, and the at least one group of candidate attribute information is at least one candidate attribute vector in a one-to-one correspondence.

Illustratively, when the computer instructions are run by the processor 530, the following step is also executed: aggregating all the candidate attribute vectors belonging to a same prediction object among the at least one candidate attribute vector to obtain an aggregate attribute vector belonging to each prediction object among the at least one prediction object.

Illustratively, the step of aggregating all the candidate attribute vectors belonging to a same prediction object among the at least one attribute position vector to obtain the aggregate attribute vector belonging to each prediction object among the at least one prediction object, executed when the computer instructions are run by the processor 530, includes one of the following: averaging all the candidate attribute vectors belonging to any prediction object among the at least one prediction object to obtain the aggregate attribute vector belonging to the prediction object; and selecting a candidate attribute vector with maximum modulus, from all the candidate attribute vectors belonging to any prediction object among the at least one prediction object, as the aggregate attribute vector of the prediction object.

Illustratively, when the computer instructions are run by the processor 530, the following step is also executed: outputting the aggregate attribute vector of each prediction object among the at least one prediction object.

Illustratively, the at least one candidate position is at least one candidate bounding box in a one-to-one correspondence, and when the computer program instructions are run by the processor 530, the following step is also executed: filtering all the candidate bounding boxes belonging to the same prediction object among the at least one prediction object to obtain a filtered bounding box belonging to each prediction object among the at least one prediction object.

Illustratively, the step of filtering all the candidate bounding boxes belonging to the same prediction object among the at least one prediction object to obtain the filtered bounding box belonging to each prediction object among the at least one prediction object, executed when the computer instructions are run by the processor 530, includes: determining candidate bounding boxes belonging to the same prediction object among the at least one candidate bounding boxes by performing non-maximum suppression on the at least one candidate bounding box, and obtaining the filtered bounding box belonging to each prediction object among the at least one prediction object.

Illustratively, the step of aggregating all the candidate attribute vectors belonging to the same prediction object among the at least one attribute position vector to obtain the aggregate attribute vector belonging to each prediction object among the at least one prediction object, executed when the computer instructions are run by the processor 530, includes: as for each candidate attribute vector belonging to any prediction object among the at least one prediction object, calculating the distance between the candidate bounding box corresponding to the candidate attribute vector and the filtered bounding box of the prediction object, and calculating the weighting of the candidate attribute vector according to the distance; and performing weighted average on all the candidate attribute vectors belonging to any prediction object among the at least one prediction object according to the calculated weighting to obtain the aggregate attribute vector belonging to the prediction object.

Figure 6:
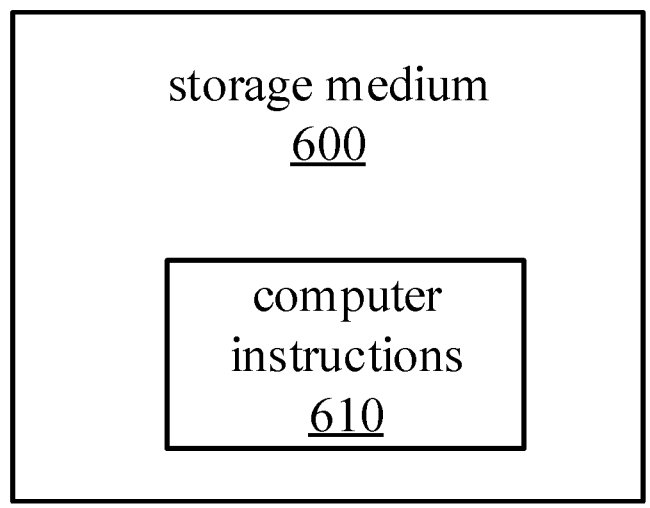
FIG. 6 is a schematic block diagram of a storage medium provided by an embodiment of the present disclosure.

In addition, the embodiments of the present disclosure further provide a non-volatile storage medium 600. As shown in FIG. 6, computer instructions are stored in the storage medium 600. When the computer instructions are run by a computer or a processor, corresponding steps of the object detection method provided by the embodiments of the present disclosure are executed, and corresponding modules in the object detection device provided by the embodiment of the present disclosure are implemented. The storage medium, for example, can include a memory card of a smart phone, a storage unit of a tablet PC, a hard disk of a personal computer, an ROM, an erasable programmable read-only memory (EPROM), a compact disc read-only memory (CD-ROM), a USB memory or any combination of the above storage media.

In one embodiment, when the computer instructions are run by the computer or the processor, the computer or the processor can implement the functional modules of the object detection device provided by the embodiments of the present disclosure and/or execute the object detection method provided by the embodiments of the present disclosure.

In one embodiment, when the computer instructions are run, the following steps are executed: acquiring an image to be processed; and inputting the image to be processed into a neural network to obtain a feature map outputted by the neural network. The feature map includes position channels and attribute channels; the position channels include at least one group of candidate position information respectively corresponding to at least one candidate position of at least one prediction object in the image to be processed; and the attribute channels include at least one group of candidate attribute information respectively corresponding to the at least one candidate position.

Illustratively, the at least one group of candidate position information is at least one candidate position vector in a one-to-one correspondence, and the at least one group of candidate attribute information is at least one candidate attribute vector in a one-to-one correspondence.

Illustratively, when the computer instructions are run, the following step is also executed: aggregating all the candidate attribute vectors belonging to a same prediction object among the at least one candidate attribute vector to obtain an aggregate attribute vector belonging to each prediction object among the at least one prediction object.

Illustratively, the step of aggregating all the candidate attribute vectors belonging to a same prediction object among the at least one attribute position vector to obtain the aggregate attribute vector belonging to each prediction object among the at least one prediction object, executed when the computer instructions are run, includes one of the following: averaging all the candidate attribute vectors belonging to any prediction object among the at least one prediction object to obtain the aggregate attribute vector of the prediction object; and selecting a candidate attribute vector with maximum modulus, from all the candidate attribute vectors belonging to any prediction object among the at least one prediction object, as the aggregate attribute vector of the prediction object.

Illustratively, when the computer instructions are run, the following step is also executed: outputting the aggregate attribute vector of each prediction object among the at least one prediction object.

Illustratively, the at least one candidate position is at least one candidate bounding box in a one-to-one correspondence, and when the computer instructions are run, the following step is also executed: filtering all the candidate bounding boxes belonging to the same prediction object among the at least one prediction object to obtain a filtered bounding box belonging to each prediction object among the at least one prediction object.

Illustratively, the step of filtering all the candidate bounding boxes belonging to the same prediction object among the at least one prediction object to obtain the filtered bounding box belonging to each prediction object among the at least one prediction object, executed when the computer instructions are run, includes: determining candidate bounding boxes belonging to the same prediction object among the at least one candidate bounding boxes by performing non-maximum suppression on the at least one candidate bounding box, and obtaining the filtered bounding box belonging to each prediction object among the at least one prediction object.

Illustratively, the step of aggregating all the candidate attribute vectors belonging to the same prediction object among the at least one attribute position vector to obtain the aggregate attribute vector belonging to each prediction object among the at least one prediction object, executed when the computer instructions are run, includes: as for each candidate attribute vector belonging to any prediction object among the at least one prediction object, calculating a distance between the candidate bounding box corresponding to the candidate attribute vector and the filtered bounding box of the prediction object, and calculating a weighting of the candidate attribute vector according to the distance; and performing weighted average on all the candidate attribute vectors belonging to any prediction object among the at least one prediction object according to the calculated weighting to obtain the aggregate attribute vector belonging to the prediction object.

The modules in the object detection system provided by the embodiments of the present disclosure can be implemented by adoption of the processor in the electronic device for implementing object detection provided by the embodiments of the present disclosure to run the computer instructions stored in the memory, or can be implemented when the computer instructions, stored in the computer readable storage medium of the computer program product provided by the embodiments of the present disclosure, are run by a computer.

Although the preferred embodiments have been described herein with reference to the drawings, it should be understood that the preferred embodiments are illustrative only and not intended to limit the scope of the present disclosure. Various changes and modifications can be made by those skilled in the art therein without departing from the scope and the spirit of the present disclosure. All such changes and modifications are intended to fall within the scope of the present disclosure as claimed.

It should be understood by those skilled in the art that the units and the algorithm steps of the examples described in connection with the embodiments of the present disclosure can be implemented in electronic hardware or a combination of computer software and electronic hardware. Whether these functions are performed in hardware or software depends on the specific application and the design constraints of the technical proposal. Different methods can be used by those skilled in the art to implement the described functions for each particular application, but such implementation should not be considered to be beyond the scope of the present disclosure.

In several embodiments provided by the present disclosure, it should be understood that the disclosed apparatus and methods can be implemented in other ways. For example, the device embodiments described above are merely illustrative. For example, the division of modules is merely logical function division. In actual implementation, there may be another division manner. For example, a plurality of modules or components may be combined or integrated into another device, or some features can be ignored or not executed.

In the description provided herein, numerous specific details are set forth. However, it should be understood that the embodiments of the present disclosure may be practiced without these specific details. In some examples, well-known methods, structures, and techniques are not described in detail so as not to obscure the understanding of this description.

Similarly, it should be understood that in order to simplify the present disclosure and to facilitate understanding of one or more of the disclosed aspects, in the description of the exemplary embodiments of the present disclosure, various features of the present disclosure are sometimes grouped together into a single embodiment, figure, or the description thereof. However, the method of the present disclosure should not be construed as reflecting the intention that the claimed disclosure requires more features than those explicitly recited in each claim. More precisely, as reflected by corresponding claims, it is claimed that the technical problems can be solved with fewer features than all of the features of a single disclosed embodiment. Thus, the claims in accordance with the detailed description are hereby explicitly incorporated into the detailed description, wherein each claim is taken as a separate embodiment of the present disclosure.

It will be understood by those skilled in the art that all the characteristics disclosed in the description (including the accompanying claims, the abstract and the drawings) and all the processes or units of any method or device so disclosed may be combined in any combination, unless the characteristics are mutually exclusive. Unless otherwise stated, each characteristic disclosed in the description (including the accompanying claims, the abstract and the drawings) may be replaced by an alternative characteristic that provides the same, equivalent or similar purpose.

In addition, it should be understood by those skilled in the art that although some embodiments described herein include certain characteristics that are included in other embodiments and other characteristics, the combinations of characteristics of different embodiments mean being within the scope of the present disclosure and forming different embodiments. For example, in the claims, any one of the claimed embodiments can be used in any combination.

Various component embodiments of the present disclosure can be implemented in hardware, or in a software module running on one or more processors, or in a combination thereof. It should be understood by those skilled in the art that some or all of the functions of some modules in the object detection device provided by the embodiments of the present disclosure may be implemented in practice by adoption of an MPU or a DSP. The present disclosure can also be implemented as executing some or all of the device programs (e.g., computer programs and computer program products) of the method described herein. Such a program for implementing the present disclosure can be stored on a computer readable medium or may be in the form of one or more signals. Such signals can be downloaded from the Internet website, or provided on the carrier signal, or provided in any other form.

It should be noted that the above embodiments are illustrative of the present disclosure and are not intended to limit the present disclosure, and those skilled in the art can design alternative embodiments without departing from the scope of the appended claims. In the claims, any reference signs placed between parentheses shall not be construed as a limitation. The word "comprising" does not exclude the presence of the elements or steps that are not recited in the claims. The word "a" or "an" preceding an element does not exclude the presence of a plurality of such elements. The present disclosure can be implemented by means of hardware comprising several distinct elements, and by means of a suitably programmed computer. In the unit claims enumerating several means, several of these means can be embodied by the same hardware item. The use of the words first, second, third and the like does not indicate any order. These words can be interpreted as name.

The foregoing is only the preferred embodiments of the present disclosure or the description of the preferred embodiments and not intended to limit the scope of protection of the present disclosure. Any change or replacement that may be easily thought of by those skilled in the art within the technical scope disclosed by the present disclosure shall fall within the scope of protection of the present disclosure. Therefore, the scope of protection of the present disclosure shall be defined by the appended claims.

What is claimed is:

1. An object detection method, comprising:
   acquiring an image to be processed; and inputting the image to be processed into a neural network to obtain a feature map outputted by the neural network, wherein the feature map comprises position channels and attribute channels; the position channels comprise at least one group of candidate position information respectively corresponding to at least one candidate position of at least one prediction object in the image to be processed; and the attribute channels comprise at least one group of candidate attribute information respectively corresponding to the at least one candidate position.

2. The object detection method according to claim 1, wherein the at least one group of candidate position information is at least one candidate position vector in a one-to-one correspondence; and the at least one group of candidate attribute information is at least one candidate attribute vector in a one-to-one correspondence.

3. The object detection method according to claim 2, further comprising:

aggregating all candidate attribute vectors belonging to a same prediction object among the at least one candidate attribute vector to obtain an aggregate attribute vector belonging to each prediction object among the at least one prediction object.

4. The object detection method according to claim 3, wherein aggregating all the candidate attribute vectors belonging to a same prediction object among the at least one candidate attribute vector to obtain the aggregate attribute vector belonging to each prediction object among the at least one prediction object comprises:

averaging all the candidate attribute vectors belonging to any prediction object among the at least one prediction object to obtain the aggregate attribute vector belonging to the prediction object; or selecting a candidate attribute vector with maximum modulus, from all the candidate attribute vectors belonging to any prediction object among the at least one prediction object, as the aggregate attribute vector of the prediction object.

5. The object detection method according to claim 3, further comprising:

outputting the aggregate attribute vector of each prediction object among the at least one prediction object.

6. The object detection method according to claim 3, wherein the at least one candidate position is the at least one candidate bounding box in a one-to-one correspondence; and the object detection method further comprises:

filtering all candidate bounding boxes belonging to a same prediction object among the at least one prediction object to obtain a filtered bounding box belonging to each prediction object among the at least one prediction object.

7. The object detection method according to claim 6, wherein aggregating all the candidate attribute vectors belonging to the same prediction object among the at least one attribute position vector to obtain the aggregate attribute vector belonging to each prediction object among the at least one prediction object comprises:

as for each candidate attribute vector belonging to any prediction object among the at least one prediction object, calculating a distance between the candidate bounding box corresponding to the candidate attribute vector and the filtered bounding box of the prediction object, and calculating a weighting of the candidate attribute vector according to the distance; and performing weighted average on all the candidate attribute vectors belonging to any prediction object among the at least one prediction object according to the calculated weighting to obtain the aggregate attribute vector belonging to the prediction object.

8. The object detection method according to claim 1, wherein the at least one candidate position is at least one candidate bounding box in a one-to-one correspondence; and the object detection method further comprises:

filtering all candidate bounding boxes belonging to a same prediction object among the at least one prediction object to obtain a filtered bounding box belonging to each prediction object among the at least one prediction object.

9. The object detection method according to claim 8, wherein filtering all the candidate bounding boxes belonging to the same prediction object among the at least one prediction object to obtain the filtered bounding box belonging to each prediction object among the at least one prediction object comprises:

determining candidate bounding boxes belonging to the same prediction object among the at least one candidate bounding box by performing non-maximum suppression on the at least one candidate bounding box, and obtaining the filtered bounding box belonging to each prediction object among the at least one prediction object.

10. A non-volatile storage medium, wherein computer instructions are stored in the non-volatile storage medium; and the object detection method according to claim 1 is executed when the computer instructions are run.

11. An object detection device, comprising:

an acquisition module configured to acquire an image to be processed; and an input module configured to input the image to be processed into a neural network to obtain a feature map outputted by the neural network, wherein the feature map comprises position channels and attribute channels; the position channels comprise at least one group of candidate position information respectively corresponding to at least one candidate position of at least one prediction object in the image to be processed; and the attribute channels comprise at least one group of candidate attribute information respectively corresponding to the at least one candidate position.

12. An object detection system, comprising:

a processor; and a storage device, wherein computer instructions are stored in the storage device; and an object detection method is executed when the computer instructions are run by the processor; the object detection method comprises:

acquiring an image to be processed; and inputting the image to be processed into a neural network to obtain a feature map outputted by the neural network, wherein the feature map comprises position channels and attribute channels; the position channels comprise at least one group of candidate position information respectively corresponding to at least one candidate position of at least one prediction object in the image to be processed; and the attribute channels comprise at least one group of candidate attribute information respectively corresponding to the at least one candidate position.

13. The object detection system according to claim 12, wherein the at least one group of candidate position information is at least one candidate position vector in a one-to-one correspondence; and the at least one group of candidate attribute information is at least one candidate attribute vector in a one-to-one correspondence.

14. The object detection system according to claim 13, wherein the object detection method further comprises:
aggregating all candidate attribute vectors belonging to a same prediction object among the at least one candidate attribute vector to obtain an aggregate attribute vector belonging to each prediction object among the at least one prediction object.

15. The object detection system according to claim 14, wherein aggregating all the candidate attribute vectors belonging to a same prediction object among the at least one candidate attribute vector to obtain the aggregate attribute vector belonging to each prediction object among the at least one prediction object comprises:
averaging all the candidate attribute vectors belonging to any prediction object among the at least one prediction object to obtain the aggregate attribute vector belonging to the prediction object; or
selecting a candidate attribute vector with maximum modulus, from all the candidate attribute vectors belonging to any prediction object among the at least one prediction object, as the aggregate attribute vector of the prediction object.

16. The object detection system according to claim 14, wherein the object detection method further comprises:
outputting the aggregate attribute vector of each prediction object among the at least one prediction object.

17. The object detection system according to claim 14, wherein the at least one candidate position is the at least one candidate bounding box in a one-to-one correspondence; and
the object detection method further comprises:
filtering all candidate bounding boxes belonging to a same prediction object among the at least one prediction object to obtain a filtered bounding box belonging to each prediction object among the at least one prediction object.

18. The object detection system according to claim 17, wherein aggregating all the candidate attribute vectors belonging to the same prediction object among the at least one attribute position vector to obtain the aggregate attribute vector belonging to each prediction object among the at least one prediction object comprises:
for each candidate attribute vector belonging to any prediction object among the at least one prediction object, calculating a distance between the candidate bounding box corresponding to the candidate attribute vector and the filtered bounding box of the prediction object, and calculating a weighting of the candidate attribute vector according to the distance; and
performing weighted average on all the candidate attribute vectors belonging to any prediction object among the at least one prediction object according to the calculated weighting to obtain the aggregate attribute vector belonging to the prediction object.

19. The object detection system according to claim 12, wherein the at least one candidate position is at least one candidate bounding box in a one-to-one correspondence; and
the object detection method further comprises:
filtering all candidate bounding boxes belonging to a same prediction object among the at least one prediction object to obtain a filtered bounding box belonging to each prediction object among the at least one prediction object.

20. The object detection system according to claim 19, wherein filtering all the candidate bounding boxes belonging to the same prediction object among the at least one prediction object to obtain the filtered bounding box belonging to each prediction object among the at least one prediction object comprises:
determining candidate bounding boxes belonging to the same prediction object among the at least one candidate bounding box by performing non-maximum suppression on the at least one candidate bounding box, and
obtaining the filtered bounding box belonging to each prediction object among the at least one prediction object.

* * * * *